Patented Dec. 20, 1949

2,491,934

UNITED STATES PATENT OFFICE 2,491,934

POLYAMIDE COMPOSITIONS

Russell H. Schlattman, Richmond Heights, Mo., assignor to Monsanto Chemical Company, St. Louis, Mo., a corporation of Delaware No Drawing. Application November 8, 1947, Serial No. 784,931

16 Claims. (Cl. 260—30.8)

This invention relates to compositions comprising synthetic linear polyamides, and more particularly, this invention relates to compositions comprising certain hydroxy substituted diphenyl sulfones and certain synthetic linear copolymers formed by the copolymerization of complementary amide-forming components.

The simple or two component polyamides formed by the polymerization of a single diamine and a single dicarboxylic acid have high melting and softening points and are well known as being excellent materials for the formation of synthetic fibers. However, these simple polyamides are generally not formed into films and sheets because their high melting points, microcrystalline structure and general insolubility in most solvents make the formation of sheets and films of simple polyamides difficult. Moreover, for the most part, sheets and films of plasticized simple polyamides cannot be prepared as most of the materials which are known to have plasticizing action when incorporated with other plasticizable resins such as cellulose esters, polyvinyl chloride and other polymerized vinyl resins are incompatible with the simple polyamides. On the other hand, the four or more component polyamides, such as are described in U. S. Patent No. 2,252,554 have much lower softening and melting points and otherwise more nearly resemble plasticizable resins than do the simple or two component polyamides and, therefore, possess the potentialities of being very desirable for the purpose of forming sheets and films of polyamide compositions of satisfactory clarity and flexibility. Likewise, the three component polyamides, such as are described in U. S. Patents Nos. 2,252,555 and 2,285,009, by reason of their lower softening points and melting points and less pronounced crystallinity, as compared to the simple polyamides, possess the potentialities of being very desirable for sheet and film-forming purposes. The four or more component polyamides are preferred over the three component polyamides for the purpose of this invention, as the three component polyamides in many respects more nearly resemble the two component or simple polyamides than the plasticizable resins which the four or more component polyamides more nearly resemble, although similar advantageous results may be achieved by the use of the three component polyamides in the practice of this invention.

While the four or more component polyamides have been formed into sheets and films which have a variety of utilities by reason of their increased pliability over the simple polyamides, and while these four or more component polyamides can be successfully plasticized with certain aryl sulfonamides and certain N-alkyl arylsulfonamides to form sheets of increased pliability over the unplasticized four or more component polyamides, both the unplasticized polyamides and the sulfonamide plasticized compositions possess certain deficiencies which seriously restrict the utility of the films.

Among the disadvantages which plasticized and unplasticized multicomponent polyamides (by multicomponent polyamides is meant to include three component, four component and more than four component polyamides, but to exclude the simple or two component polyamide) have when compared with simple polyamides is increased water permeability. An evaluation of a film's "moisture sensitivity" or "water permeability" is a measure of the resistance these films offer to the diffusion of water through the films. Therefore, films of increased "moisture sensitivity" or having increased "water permeability" means that the films permit increased amounts of water to be diffused through them.

Plastic films are extensively used to package a wide variety of articles, particularly food products and precision machined parts for engines, motors and other types of machinery. The primary purpose of packaging such articles in plastic films is to protect the article from the deleterious effects and moisture, particularly when such articles are destined for overseas shipments or might otherwise be subjected to atmospheres of high moisture content, and therefore it is of utmost importance that the plastic films have the maximum degree of resistance to the transfer of moisture through the films.

While films of polyamide materials are preferred for packaging purposes, because of their greater strength and toughness over other types of plastic films, they do possess a decided disadvantage due to the fact that films both of unplasticized and plasticized multicomponent polyamides have a high water permeability.

It is an object of this invention to provide certain polyamide compositions which have increased resistance to water permeability, particularly polyamide compositions containing four or more component polyamide resins. A further object is to provide certain plasticized polyamide compositions which have increased resistance to water permeability, particularly plasticized polyamide compositions containing four or more component polyamide resins.

I have now discovered that certain polyamide compositions of decreased water permeability may be prepared by incorporating therein certain hydroxy substituted diphenyl sulfones. Moreover, I have also discovered that the water sensitivy of certain plasticized polyamide compositions may be improved by incorporating certain hydroxy substituted diphenyl sulfones into those plasticized compositions.

While hydroxy-substituted diphenyl sulfones, generally, improve the resistance of polyamide compositions to water permeability, I prefer to use a dihydroxy substituted diphenyl sulfone, such as 4-4'-dihydroxy diphenyl sulfone or 2-2'-dihydroxy diphenyl sulfone. While hydroxy substituted diphenyl sulfones having other substituents such as alkyl, alkoxy, amino or carboxy groups may likewise be advantageously incorporated into the polyamide compositions to improve the moisture sensitivity of the polyamide compositions, I prefer to use the unsubstituted dihydroxy diphenyl sulfones such as p-p'-dihydroxy diphenyl sulfone.

The polyamides most suitable for incorporation into the novel compositions of this invention are those nylon-type multicomponent polyamide resins formed by the copolymerization, as described in U. S. Patent 2,252,554, of at least four different amide-forming reactants, at least one of which is a diprimary diamine and at least one other of which is a dicarboxylic acid or an amide-forming derivative of a dibasic carboxylic acid. The other two polyamide-forming reactants may be selected from diprimary diamines different from the first selected diprimary diamine, dicarboxylic acids or amide-forming derivatives of dibasic carboxylic acids different from the first selected dicarboxylic acid or amide-forming derivatives of a dibasic dicarboxylic acid, diamines having at least one hydrogen atom on each amino group, polymerizable monoamino carboxylic acids and amide-forming derivatives of monoamino carboxylic acids. For the purposes of describing the multicomponent polyamides suitable for the plasticized compositions of this invention, a salt of a diamine and a dibasic acid is considered as representing two polyamide-forming reactants. The amine and acid polyamide-forming reactants are used in substantially equal molecular amide-forming proportions. By substantially equal amide-forming proportions is meant that not more than 5 mol per cent excess of either amino or acid amide-forming functional groups are employed, that is, the reaction mixture must not contain substantially more than 5 mol per cent excess of either amino or acid amide-forming groups of their equivalents.

Polyamides formed by the condensation polymerization of more than four amide-forming reactants (in substantially equal molecular amide-forming proportions), have properties quite similar to those polyamides having four amide-forming components and, therefore, are equally suitable for incorporation into the plasticized polyamide compositions of this invention.

While the preferred polyamides for incorporation into the compositions of this invention are substantially the "four or more component interpolyamides" described in U. S. patent No. 2,252,554, the so-called "three component interpolyamides" described in U. S. Patent Nos. 2,252,555 and 2,285,009, although not preferred, may also be used. The three component polyamide described in the latter two patents are those prepared by the condensation polymerization of two diprimary diamines and one dibasic carboxylic acid; one diprimary diamine and two dibasic carboxylic acids; or a diprimary diamine, a dibasic carboxylic acid and a polymerizable monoaminomonocarboxylic acid.

The preferred reactants for the preparation of the more suitable four or more component polyamides are diamines which may be represented by $H_2N-CH_2-R-CH_2-NH_2$ and dicarboxylic acids of the type $HOOC-R'-COOH$ wherein R and R' represent polymethylene groups, suitably of 2 to 12 methylene groups and preferably of 4 to 8 methylene groups. However, R and R' in addition to being the preferred polymethylene groups, may be, in part, other substituted alkylene groups or aryl groups such as phenylene and substituted phenylenes.

The four component linear polyamides as described above are illustrated by such interpolymers as follows:

Hexamethylene adipamide-decamethylene sebacamide

Decamethylene sebacamide-heptamethylene pimelamide

Heptamethylene pimelamide - hexamethylene adipamide

Octamethylene suberamide-hexamethylene adipamide

Nonamethylene azelamide-hexamethylene adipamide

Nonamethylene azelamide-heptamethylene adipamide

Pentamethylene sebacamide - hexamethylene adipamide

Pentamethylene adipamide-decamethylene sebacamide

Pentamethylene pimelamide-hexamethylene sebacamide

Hexamethylene suberamide-decamethylene sebacamide

Hexamethylene suberamide-decamethylene adipamide

The three component polyamides which are suitable for use in the preparation of the compositions of this invention are those linear polyamides which are produced by the condensation polymerization of three component amide-forming reaction mixtures which are illustrated as follows:

Hexamethylene diamine, adipic acid and sebacic acid

Decamethylene diamine, adipic acid and suberic acid

Hexamethylene diamine, pimelic acid and azelaic acid

Adipic acid, hexamethylene diamine and decamethylene diamine

Sebacic acid, pentamethylene diamine and hexamethylene diamine

Suberic acid, pentamethylene diamine and decamethylene diamine 6-amino caproic acid, hexamethylene diamine and sebacic acid 6-amino caproic acid pentamethylene diamine and pimelic acid The hydroxy substituted diphenyl sulfones may also be incorporated into plasticized polyamide compositions to reduce the moisture sensitivity of the plasticized compositions. Preferred plasticized polyamide compositions are those prepared from the four or more than four component polyamide resins, as above described, and as a plasticizer, therefor, aryl sulfonamides, such as toluene sulfonamide and benzene sulfonamide, and certain N-alkyl aryl sulfonamides wherein the alkyl substituent may contain up to 6 carbon atoms, such as N-ethyl toluene sulfonamide, N-butyl toluene sulfonamide and N-amyl toluene sulfonamide.

In the preparation of the novel compositions of this invention, the proportions of hydroxy substituted diphenyl sulfone to the polyamide resin to be used in a particular instance is influenced by the presence or absence of a plasticizer and is also influenced by the method by which the films or sheets are to be prepared. For example, in the preparation of unplasticized solvent cast films, while I prefer to prepare compositions containing 5 to 15 parts (herein, all proportions are given in terms of parts by weight) of the hydroxy substituted diphenyl sulfone per 100 parts of the polyamide resin, suitable compositions for the solvent casting of polyamide films of decreased moisture sensitivity may be prepared by using 5 to 25 parts of the hydroxy substituted diphenyl sulfone per 100 parts of the polyamide resin. When a plasticizer such as N-ethyl toluene sulfonamide is incorporated into the compositions for the solvent casting of plasticized films, I prefer to use a total of 10 to 30 parts of plasticizer plus sulfone per 100 parts of the polyamide resin of which 5 to 25 parts may be the selected hydroxy substituted diphenyl sulfone and 5 to 25 parts may be the selected hydroxy substituted diphenyl sulfone and 5 to 25 parts may be the plasticizer. Suitable compositions for the solvent casting of plasticized polyamide films of decreased moisture sensitivity may be prepared by using a total of up to 50 parts of plasticizer plus sulfone per 100 parts of polyamide resin, of which 10 to 40 parts may be the selected hydroxy substituted diphenyl sulfone and 10 to 40 parts may be the plasticizer.

In the formation of molded sheets, as contrasted to solvent cast films, I prefer to use compositions, for unplasticized molded sheets, containing 5 to 50 parts of a hydroxy substituted diphenyl sulfone per 100 parts of the polyamide resin, however, molded sheets of polyamide compositions of decreased water sensitivity may be prepared using 5 to 100 parts of the sulfone per 100 parts of the polyamide resin. Moreover, when a hydroxy substituted diphenyl sulfone is incorporated into plasticized polyamide compositions for molding purposes, I prefer to use a total of 10 to 30 parts of plasticizer plus sulfone per 100 parts of the polyamide resin of which 5 to 25 parts may be the selected hydroxy substituted diphenyl sulfone and 5 to 25 parts may be the plasticizer. However, suitable molding compositions of decreased water sensitivity may be prepared by using up to 100 parts of plasticizer plus hydroxy sulfone per 100 parts of polyamide resin, of which up to 90 parts may be either the hydroxy sulfone or the plasticizer.

The following procedures hereinafter described in detail are referred to in the examples wherein specimens are prepared and evaluated for their respective characteristics.

*Evaluation procedure No. 1*

The determination of the water permeability of the polyamide films was determnied substantially in accordance with the ASTM method D697–42T entitled "Water permeability of plastic sheets."

In carrying out this evaluation procedure a glass cell was employed having a 2½" internal diameter and a depth of 1¼". The cell was filled with water to within 1" of the upper edge. A film of the polyamide composition which was to be evaluated with respect to its water permeability was sealed to the upper circumferential edge of the cell with a microcrystalline petroleum wax. The assembled cell and film were then tared, placed in an anhydrous calcium chloride desiccator and maintained at a constant temperature of substantially 25° C. The cell was then taken out of the desiccator at intervals and the loss in weight recorded. When the loss in weight of the assembled cell per unit of time became substantially constant, the water diffusion constant, D, was calculated employing Fick's diffusion law as follows:

$$D = \frac{Nx}{At(p_1 - p_2)}$$

wherein N is the number of grams of water which diffuses through a cross-sectional area A (sq. cm.) through a thickness $x$ (cm.) in time $t$ (hours). $(p_1-p_2)$ is the difference, in mm. of Hg, between the saturated vapor pressure of water within the cell at the temperature within the desiccator and the partial pressure of the water vapor over the desiccant at that temperature. The constant D thus indicates the number of grams of water per hour which will pass through a 1 cm. cube of the plastic under a vapor-pressure difference of 1 mm. Hg.

Each cell is run until a constant value of D is obtained in order that the specimen is in equilibrium with respect to sorption. This may require from 2 to 3 days to several weeks, depending on the thickness, water sorption and permeability of the specimen. When the water permeability tests are being run, it is advisable to change the desiccant frequently in order that the partial pressure of water vapor over the desiccant will remain at a substantially constant minimum and will not be increased due to the saturation of the desiccant.

*Evaluation procedure No. 2*

Thin uniform films of the polyamide compositions were formed by means of a solvent casting procedure. In this procedure, a 10% solution of the polyamide resin is prepared by refluxing the polyamide resin in a solvent composed of 80% ethanol and 20% water. Refluxing for one hour usually suffices to effect a solution of the polyamide resin in the ethanol solvent, which solution, although complete, will present a slightly opalescent appearance. However, polyamide solutions so prepared have a tendency to gel, although this gel may be broken by merely warming the material to 70° C. with mild stirring.

Plasticizers and other compounds, such as the hydroxy substituted diphenyl sulfones, which are desired to be incorporated into the polyamide compositions may be added to the polyamide resin-ethanol solution. Such additional plasticizers and other compounds must necessarily be soluble in the 80% ethanol-20% water solvent.

To form thin films, the polyamide compositions in solution in the ethanol-water solvent, are cast on 8x18" plate glass slides which are prepared for casting by warming the glass slides to 70° C. in a drying oven. The polyamide solution is similarly prepared for casting by warming the solution to 70° C. The warmed polyamide solutions are cast on the warmed plate glass slide using a Hercules film casting knife with a technique well known to the art.

After the polyamide film has been cast, the plate glass slide with the cast film thereon is placed in a convection current drying oven for 3 hours at 70° C. After drying, the film is stripped from the plate glass slide and is ready for evaluation with respect to specific characteristics.

Example I

A film of a four component polyamide resin, a hexamethylene adipamide-decamethylene sebacamide interpolymer prepared by the condensation polymerization of 41.2 parts by weight of hexamethylene diammonium adipate and 58.8 parts by weight of decamethylene diammonium sebacate and having a M. P. of 140° C., was prepared in the manner described under Procedure No. 2.

The cast film, after removal from the plate glass slide, measured .0050 cm. and the water permeability constant of this film, as determined in the manner described under Procedure No. 1 was 12.7.

Example II

A film of a plasticized four component polyamide resin composition was prepared by adding N-ethyl toluene sulfonamide plasticizer in the proportion of 10 parts of plasticizer per hundred parts of polyamide resin, to an ethanol-water-polyamide resin solution prepared in accordance with Procedure No. 2. The resin was a four component polyamide resin, a hexamethylene adipamide-decamethylene sebacamide interpolymer prepared by the condensation polymerization of 41.2 parts by weight of a hexamethylene diammonium-adipate and 38.8 parts by weight of decamethylene diammonium-sebacate and having a M. P. of 140° C.

The cast film measured .0055 cm. in thickness and evidenced a water permeability constant of 10.5.

Example III

A cast film of a plasticized polyamide resin was prepared using the same plasticizer and polyamide resin of Example II. However, the plasticizer was incorporated in the ratio of 25 parts of plasticizer per 100 parts of polyamide resin. The water permeability constant of this film was 13.6.

Example IV

A cast film similar to that of Example III was prepared, however, the ratio of plasticizer to polyamide resin was increased to 50 parts of N-ethyl toluene sulfonamide per 100 parts of the four component polyamide resin.

The water permeabiilty constant of this film was 18.4.

Example V

A cast film was prepared using the same four component polyamide resin as used in Example I, however, 10 parts of 4-4'-dihydroxy diphenyl sulfone was added to the polyamide resin-ethanol-water solution prior to the casting of the film.

The film was of .0050 cm. thickness and the water permeability constant was determined to be 8.6.

A comparison of the water permeability constant of the polyamide film of Example I with the water permeability constant of Example V shows that the water permeability of a polyamide film was reduced substantially 30% by the addition of 4-4'-dihydroxy diphenyl sulfone to the same resin.

Example VI

A cast film was prepared comprising the same four component polyamide resin as used in the previously described examples, 5 parts of N-ethyl toluene sulfonamide per 100 parts of polyamide resin and 7.5 parts of 4-4'-dihydroxy diphenyl sulfone per 100 parts of polyamide resin.

The water permeability of the film was 10.5.

Example VII

A cast film was prepared comprising the same four component polyamide resin as used in the previously described examples, 18.75 parts of N-ethyl toluene sulfonamide per 100 parts of polyamide resin and 6.25 parts of 4-4'-dihydroxy diphenyl sulfone per 100 parts of polyamide resin.

The water permeability of the film was 10.5.

The flexibility of polyamide compositions is improved, particularly at lower temperatures by the addition of flexibilizing plasticizers such as N-ethyl toluene sulfonamide. The greater the proportion of flexibilizing plasticizer which is incorporated into the polyamide compositions, the lower the temperature to which the compositions may be subjected and still retain their elastomeric and flexible characteristics. However, as Examples II, III and IV show, when the proportion of plasticizer is increased in order to obtain better low-temperature flexibility characteristics, simultaneously the compositions become poorer with respect to water permeability resistance. On the other hand, Examples VI and VII show that when 4-4'-dihydroxy diphenyl sulfone was incorporated into these plasticized polyamide compositions, even when the plasticizer content was increased, the water permeability of all these compositions remained substantialy constant at a considerably reduced figure.

In other words, the practice of this invention permits a higher degree of plasticization of certain polyamide resins substantially without increasing the moisture sensitivity of the compositions.

I claim:

1. A polyamide composition comprising 5 to 50 parts by weight of a hydroxy substituted diphenyl sulfone per 100 parts of a polyamide resin selected from the group consisting of (A) polyamide resins formed by the condensation polymerization of 3 different complementary amide-forming reactants selected from the group consisting of (a) diprimary diamines of the type $H_2N-CH_2-R-CH_2-NH_2$ wherein R represents at least 4 and not more than 8 methylene groups (b) dicarboxylic acids of the type

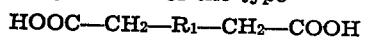

wherein $R_1$ represents at least 2 and not more than 6 methylene groups, (B) polyamide resins formed by the condensation polymerization of a diprimary diamine of the type

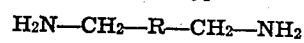

wherein R represents at least 4 and not more than 8 methylene groups, a dicarboxylic acid of the type $HOOC-CH_2-R_1-CH_2-COOH$ wherein $R_1$ represents at least 2 and not more than 6 methylene groups and a monoaminocarboxylic acid of the type

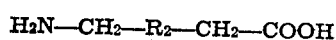

wherein $R_2$ represents at least 3 and not more than 7 methylene groups, and (C) polyamide resins formed by the condensation polymerization of at least 4 different amide-forming reactants of which at least 2 are diprimary diamines of the type

wherein R represents at least 4 and not more than 8 methylene groups and at least 2 different complementary amide-forming reactants selected from the class consisting of (a) dicarboxylic acids of the type $$HOOC-CH_2-R_1-CH_2-COOH$$

wherein $R_1$ represents at least 2 and not more than 6 methylene groups and (b) amide-forming derivatives of said type of carboxylic acids.

2. A solvent cast film of a polyamide composition comprising 5 to 25 parts by weight of a hydroxy substituted diphenyl sulfone per 100 parts of a polyamide resin selected from the group consisting of (A) polyamide resins formed by the condensation polymerization of 3 different complementary amide-forming reactants selected from the group consisting of (a) diprimary diamines of the type $$H_2N-CH_2-R-CH_2-NH_2$$

wherein R represents at least 4 and not more than 8 methylene groups (b) dicarboxylic acids of the type $$HOOC-CH_2-R_1-CH_2-COOH$$

wherein $R_1$ represents at least 2 and not more than 6 methylene groups, (B) polyamide resins formed by the condensation polymerization of a diprimary diamine of the type $$H_2N-CH_2-R-CH_2-NH_2$$

wherein R represents at least 4 and not more than 8 methylene groups, a dicarboxylic acid of the type $HOOC-CH_2-R_1-CH_2-COOH$ wherein $R_1$ represents at least 2 and not more than 6 methylene groups and a monoaminocarboxylic acid of the type $$H_2N-CH_2-R_2-CH_2-COOH$$

wherein $R_2$ represents at least 3 and not more than 7 methylene groups, and (C) polyamide resins formed by the condensation polymerization of at least 4 different amide-forming reactants of which at least 2 are diprimary diamines of the type $$H_2N-CH_2-R-CH_2-NH_2$$

wherein R represents at least 4 and not more than 8 methylene groups and at least 2 different complementary amide-forming reactants selected from the class consisting of (a) dicarboxylic acids of the type $$HOOC-CH_2-R_1-CH_2-COOH$$

wherein $R_1$ represents at least 2 and not more than 6 methylene groups and (b) amide-forming derivatives of said type of carboxylic acids.

3. A solvent cast film of a polyamide composition comprising 5 to 15 parts by weight of 4-4'-dihydroxy diphenyl sulfone per 100 parts of a polyamide resin selected from the group consisting of (A) polyamide resins formed by the condensation polymerization of 3 different complementary amide-forming reactants selected from the group consisting of (a) diprimary diamines of the type $$H_2N-CH_2-R-CH_2-NH_2$$

wherein R represents at least 4 and not more than 8 methylene groups (b) dicarboxylic acids of the type $$HOOC-CH_2-R_1-CH_2-COOH$$

wherein $R_1$ represents at least 2 and not more than 6 methylene groups, (B) polyamide resins formed by the condensation polymerization of a diprimary diamine of the type $$H_2N-CH_2-R-CH_2-NH_2$$

wherein R represents at least 4 and not more than 8 methylene groups, a dicarboxylic acid of the type $HOOC-CH_2-R_1-CH_2-COOH$ wherein $R_1$ represents at least 2 and not more than 6 methylene groups and a monoaminocarboxylic acid of the type $$H_2N-CH_2-R_2-CH_2-COOH$$

wherein $R_2$ represents at least 3 and not more than 7 methylene groups, and (C) polyamide resins formed by the condensation polymerization of at least 4 different amide-forming reactants of which at least 2 are diprimary diamines of the type $$H_2N-CH_2-R-CH_2-NH_2$$

wherein R represents at least 4 and not more than 8 methylene groups and at least 2 different complementary amide-forming reactants selected from the class consisting of (a) dicarboxylic acids of the type $$HOOC-CH_2-R_1-CH_2-COOH$$

wherein $R_1$ represents at least 2 and not more than 6 methylene groups and (b) amide-forming derivatives of said type of carboxylic acids.

4. A polyamide composition comprising a plasticizer and 5 to 50 parts by weight of a hydroxy substituted diphenyl sulfone per 100 parts of a polyamide resin selected from the group consisting of (A) polyamide resins formed by the condensation polymerization of 3 different complementary amide-forming reactants selected from the group consisting of (a) diprimary diamines of the type $$H_2N-CH_2-R-CH_2-NH_2$$

wherein R represents at least 4 and not more than 8 methylene groups (b) dicarboxylic acids of the type $$HOOC-CH_2-R_1-CH_2-COOH$$

wherein $R_1$ represents at least 2 and not more than 6 methylene groups, (B) polyamide resins formed by the condensation polymerization of a diprimary diamine of the type $$H_2N-CH_2-R-CH_2-NH_2$$

wherein R represents at least 4 and not more than 8 methylene groups, a dicarboxylic acid of the type $HOOC-CH_2-R_1-CH_2-COOH$ wherein $R_1$ represents at least 2 and not more than 6 methylene groups and a monoaminocarboxylic acid of the type $$H_2N-CH_2-R_2-CH_2-COOH$$

wherein $R_2$ represents at least 3 and not more than 7 methylene groups, and (C) polyamide resins formed by the condensation polymerization of at least 4 different amide-forming reactants of which at least 2 are diprimary diamines of the type $$H_2N-CH_2-R-CH_2-NH_2$$

wherein R represents at least 4 and not more than 8 methylene groups and at least 2 different complementary amide-forming reactants selected from the class consisting of (a) dicarboxylic acids of the type $$HOOC-CH_2-R_1-CH_2-COOH$$

wherein $R_1$ represents at least 2 and not more than 6 methylene groups and (b) amide-forming derivatives of said type of carboxylic acids.

5. A polyamide composition comprising a total of 10 to 50 parts by weight of a plasticizer plus 4-4'-dihydroxy diphenyl sulfone, of which said 10 to 30 parts, 5 to 25 parts are N-ethyl toluene sulfonamide plasticizer and 5 to 25 parts are 4-4'-dihydroxy diphenyl sulfone, per 100 parts of a polyamide resin selected from the group consisting of (A) polyamide resins formed by the condensation polymerization of 3 different complementary amide-forming reactants selected from the group consisting of (a) diprimary diamines of the type $$H_2N-CH_2-R-CH_2-NH_2$$

wherein R represents at least 4 and not more than 8 methylene groups (b) dicarboxylic acids of the type $$HOOC-CH_2-R_1-CH_2-COOH$$

wherein $R_1$ represents at least 2 and not more than 6 methylene groups, (B) polyamide resins formed by the condensation polymerization of a diprimary diamine of the type $$H_2N-CH_2-R-CH_2-NH_2$$

wherein R represents at least 4 and not more than 8 methylene groups, a dicarboxylic acid of the type $$HOOC-CH_2-R_1-CH_2-COOH$$

wherein $R_1$ represents at least 2 and not more than 6 methylene groups and a monoaminocarboxylic acid of the type $$H_2N-CH_2-R_2-CH_2-COOH$$

wherein $R_2$ represents at least 3 and not more than 7 methylene groups, and (C) polyamide resins formed by the condensation polymerization of at least 4 different amide-forming reactants of which at least 2 are diprimary diamines of the type $$H_2N-CH_2-R-CH_2-NH_2$$

wherein R represents at least 4 and not more than 8 methylene groups and at least 2 different complementary amide-forming reactants selected from the class consisting of (a) dicarboxylic acids of the type $$HOOC-CH_2-R_1-CH_2-COOH$$

wherein $R_1$ represents at least 2 and not more than 6 methylene groups and (b) amide-forming derivatives of said type of carboxylic acids.

6. A polyamide composition comprising 5 to 50 parts by weight of a hydroxy substituted diphenyl sulfone per 100 parts of a polyamide resin formed by the condensation polymerization of at least 4 different amide-forming reactants of which at least 2 are diprimary diamines of the type $$H_2N-CH_2-R-CH_2-NH_2$$

wherein R represents at least 4 and not more than 8 methylene groups and at least 2 different complementary amide-forming reactants selected from the class consisting of (a) dicarboxylic acids of the type $$HOOC-CH_2-R_1-CH_2-COOH$$

wherein $R_1$ represents at least 2 and not more than 6 methylene groups and (b) amide-forming derivatives of said type of carboxylic acids.

7. A polyamide composition comprising 5 to 25 parts by weight of a plasticizer and 5 to 25 parts by weight of a hydroxy substituted diphenyl sulfone per 100 parts of a polyamide resin formed by the condensation polymerization of at least 4 different amide-forming reactants of which at least 2 are diprimary diamines of the type $$H_2N-CH_2-R-CH_2-NH_2$$

wherein R represents at least 4 and not more than 8 methylene groups and at least 2 different complementary amide-forming reactants selected from the class consisting of (a) dicarboxylic acids of the type $$HOOC-CH_2-R_1-CH_2-COOH$$

wherein $R_1$ represents at least 2 and not more than 6 methylene groups and (b) amide-forming derivatives of said type of carboxylic acids.

8. A polyamide composition comprising a total of 10 to 30 parts by weight of a plasticizer plus a hydroxy substituted diphenyl sulfone, of which said 10 to 30 parts, 5 to 25 parts are N-ethyl toluene sulfonamide plasticizer and 5 to 25 parts are 4-4'-dihydroxy diphenyl sulfone, per 100 parts of a polyamide resin formed by the condensation polymerization of at least 4 different amide-forming reactants of which at least 2 are di-primary diamines of the type $$H_2N-CH_2-R-CH_2-NH_2$$

wherein R represents at least 4 and not more than 8 methylene groups and at least 2 different complementary amide-forming reactants selected from the class consisting of (a) dicarboxylic acids of the type $$HOOC-CH_2-R_1-CH_2-COOH$$

wherein $R_1$ represents at least 2 and not more than 6 methylene groups and (b) amide-forming derivatives of said type of carboxylic acids.

9. A polyamide composition comprising 5 to 50 parts by weight of a hydroxy substituted diphenyl sulfone per 100 parts of a polyamide resin formed by the condensation polymerization of 3 different complementary amide-forming reactants selected from the group consisting of (a) diprimary diamines of the type $$H_2N-CH_2-R-CH_2-NH_2$$

wherein R represents at least 4 and not more than 8 methylene groups (b) dicarboxylic acids of the type $$HOOC-CH_2-R_1-CH_2-COOH$$

wherein $R_1$ represents at least 2 and not more than 6 methylene groups.

10. A polyamide composition comprising 5 to 25 parts by weight of a plasticizer and 5 to 25 parts of a hydroxy substituted diphenyl sulfone per 100 parts of a polyamide resin formed by the condensation polymerization of 3 different complementary amide-forming reactants selected from the group consisting of (a) diprimary diamines of the type $$H_2N-CH_2-R-CH_2-NH_2$$

wherein R represents at least 4 and not more than 8 methylene groups (b) dicarboxylic acids of the type $$HOOC-CH_2-R_1-CH_2-COOH$$

wherein $R_1$ represents at least 2 and not more than 6 methylene groups.

11. A polyamide composition comprising a total of 10 to 30 parts by weight of a plasticizer plus a hydroxy substituted diphenyl sulfone, of which said 10 to 30 parts, 5 to 25 parts are N-ethyl toluene sulfonamide plasticizer and 5 to 25 parts are 4-4'-dihydroxy diphenyl sulfone, per 100 parts of a polyamide resin formed by the condensation polymerization of 3 different complementary amide-forming reactants selected from the group consisting of (a) diprimary diamines of the type $$H_2N-CH_2-R-CH_2-NH_2$$

wherein R represents at least 4 and not more than 8 methylene groups (b) dicarboxylic acids of the type $$HOOC-CH_2-R_1-CH_2-COOH$$

wherein $R_1$ represents at least 2 and not more than 6 methylene groups.

12. A polyamide composition comprising 5 to 50 parts by weight of 4-4'-dihydroxy diphenyl sulfone per 100 parts of a polyamide resin formed by the condensation polymerization of hexamethylene diamine, decamethylene diamine, adipic acid and sebacic acid.

13. A polyamide composition comprising 5 to 25 parts by weight of N-ethyl toluene sulfonamide plasticizer and 5 to 25 parts of 4-4'-dihydroxy diphenyl sulfone per 100 parts of a polyamide resin formed by the condensation polymerization of hexamethylene diamine, decamethylene diamine, adipic acid and sebacic acid.

14. A polyamide composition comprising 5 to 15 parts by weight of 4-4'-dihydroxy diphenyl sulfone per 100 parts of a polyamide resin formed by the condensation polymerization of hexamethylene diamine, decamethylene diamine, adipic acid and sebacic acid.

15. A polyamide composition comprising 5 to 50 parts by weight of 4-4'-dihydroxy diphenyl sulfone per 100 parts of a polyamide resin formed by the condensation polymerization of hexamethylene diamine, adipic acid and sebacic acid.

16. A polyamide composition comprising 5 to 25 parts by weight of N-ethyl toluene sulfonamide plasticizer and 5 to 25 parts of 4-4'-dihydroxy diphenyl sulfone per 100 parts of a polyamide resin formed by the condensation polymerization of hexamethylene diamine, adipic acid and sebacic acid.

RUSSELL H. SCHLATTMAN.

REFERENCES CITED

The following references are of record in the file of this patent:

UNITED STATES PATENTS

| Number | Name | Date |
|---|---|---|
| 2,127,400 | Gibbs | Aug. 16, 1938 |
| 2,252,554 | Carothers | Aug. 12, 1941 |
| 2,268,616 | Peters | Jan. 6, 1942 |